US011935675B2

(12) United States Patent
Hsiao et al.

(10) Patent No.: US 11,935,675 B2
(45) Date of Patent: Mar. 19, 2024

(54) ANTI-SURGE RESISTOR AND FABRICATION METHOD THEREOF

(71) Applicant: YAGEO CORPORATION, Kaohsiung (TW)

(72) Inventors: Shen-Li Hsiao, Kaohsiung (TW); Kuang-Cheng Lin, Kaohsiung (TW); Ren-Hong Wang, Pingtung County (TW)

(73) Assignee: YAGEO CORPORATION, Kaohsiung (TW)

( * ) Notice: Subject to any disclaimer, the term of this patent is extended or adjusted under 35 U.S.C. 154(b) by 0 days.

(21) Appl. No.: 17/930,417

(22) Filed: Sep. 8, 2022

(65) Prior Publication Data

US 2024/0006098 A1 Jan. 4, 2024

(30) Foreign Application Priority Data

Jul. 4, 2022 (CN) ........................ 202210786230.X

(51) Int. Cl.

*H01C 7/12* (2006.01)
*H01C 1/06* (2006.01)
*H01C 1/14* (2006.01)
*H01C 17/00* (2006.01)

(52) U.S. Cl.

CPC ................ *H01C 7/12* (2013.01); *H01C 1/06* (2013.01); *H01C 1/14* (2013.01); *H01C 17/00* (2013.01)

(58) Field of Classification Search

CPC ... H01C 7/12; H01C 1/06; H01C 1/14; H01C 17/00

See application file for complete search history.

(56) References Cited

U.S. PATENT DOCUMENTS

| | | | | |
|---|---|---|---|---|
| 5,313,184 | A | 5/1994 | Greuter et al. | |
| 5,861,795 | A | 1/1999 | Glatz-Reichenbach et al. | |
| 5,990,778 | A | 11/1999 | Strumpler et al. | |
| 9,532,454 | B2 * | 12/2016 | Block ................. | H01F 27/2804 |
| 2003/0154591 | A1 | 8/2003 | Strumpler et al. | |

(Continued)

FOREIGN PATENT DOCUMENTS

| | | | | |
|---|---|---|---|---|
| CN | 102741948 | A | | 10/2012 |
| TW | 464884 | B | | 11/2001 |
| WO | WO-2020194812 | A1 | * | 10/2020 |

OTHER PUBLICATIONS

WO2020194812 machine translation. (Year: 2020).*
WO2011065043 machine translation. (Year: 2011).*

*Primary Examiner* — Kyung S Lee
(74) *Attorney, Agent, or Firm* — CKC & Partners Co., LLC

(57) ABSTRACT

An anti-surge resistor and a fabrication method thereof are provided. The current anti-surge resistor includes a substrate made by a varistor material, a resistance layer disposed on the substrate, a first terminal electrode, and a second terminal electrode. In the fabrication method of the current anti-surge resistor, at first, the substrate made by the varistor material is provided. Then, the resistance layer is formed on the substrate to provide a main body, in which the main body includes the substrate and the resistance layer, and has two opposite terminals. Thereafter, the first terminal electrode is formed on one terminal of the main body, and the second terminal electrode is formed on the other terminal of the main body.

15 Claims, 7 Drawing Sheets

100

(56) References Cited

U.S. PATENT DOCUMENTS

| | | | | |
|---|---|---|---|---|
| 2004/0125530 | A1* | 7/2004 | Tominaga | H05K 1/0257 361/118 |
| 2012/0305302 | A1 | 12/2012 | Mizokami | |
| 2014/0198422 | A1* | 7/2014 | Jones | H01G 2/14 361/91.1 |
| 2019/0304636 | A1* | 10/2019 | Kirk | H01C 7/1006 |

* cited by examiner

ANTI-SURGE RESISTOR AND FABRICATION METHOD THEREOF

RELATED APPLICATIONS

This application claims priority to China application No. 202210786230.X, filed Jul. 4, 2022, the disclosures of which are incorporated herein by reference in their entireties.

BACKGROUND

Field of Invention

The present invention relates to an anti-surge resistor and a fabrication method thereof.

Description of Related Art

The known fabrication method of the resistor first uses an insulating ceramic substrate or a flexible material as a carrier board, and then performs a printing process or a physical vapor deposition (PVD) process to deposit a selected resistance material on the upper surface of the carrier board, and then respectively forms two terminal electrodes on two ends of the selected resistance material, thereby forming the resistor.

If there is no anti-surge protection element being connected in parallel with the resistor, when the resistor encounters static electricity or surge, the excessive surge will be completely absorbed by the resistor itself. At this time, the excessive current or voltage will cause damage to the finishing position (generally refers to the laser cutting position) of the material layer of the resistor, such that the resistor is affected.

In order to avoid the above-mentioned damage caused by static electricity or surge, an anti-surge protection element is usually added to be connected in parallel with the two terminal electrodes of the resistor, thereby protecting the resistor. However, if an anti-surge protection element is added to the application of the circuit, the wiring complexity of the circuit increases, and the cost of circuit fabrication also increases.

SUMMARY

The embodiments of the present invention provide an anti-surge resistor and a fabrication method thereof. The varisor material is used as the carrier substrate, and the resistance layer is formed on the carrier substrate to form the main body of the resistor, so as to avoid the damage to the main body of the resistor which is caused by static electricity or surge.

The present invention provides an anti-surge resistor. The anti-surge resistor includes a substrate made by a varistor material. The anti-surge resistor further includes a resistance layer disposed on an upper surface of the substrate to form a main body with the substrate. The main body has two opposite terminals. The anti-surge resistor further includes a first terminal electrode formed on one of the terminals of the main body and a second terminal electrode formed on the other one of the terminals of the main body.

In accordance with one or more embodiments of the invention, the first terminal electrode includes a first upper electrode, a first lower electrode, and a first side electrode. The first upper electrode is disposed on an upper surface of the main body, and the first lower electrode is disposed on a lower surface of the main body, and the first side electrode is disposed on a first side surface of the main body and extended to the first upper electrode and the first lower electrode. The second terminal electrode includes a second upper electrode, a second lower electrode, and a second side electrode. The second upper electrode is disposed on the upper surface of the main body, and the second lower electrode is disposed on the lower surface of the main body, and the second side electrode is disposed on a second side surface of the main body and extended to the second upper electrode and the second lower electrode. The upper surface of the main body is opposite to the lower surface of the main body. The first side surface of the main body is opposite to the second side surface of the main body.

In accordance with one or more embodiments of the invention, the anti-surge resistor further includes a first protective layer disposed on the upper surface of the main body and located between the first upper electrode and the second upper electrode. The first protective layer covers a portion of the resistance layer exposed by the upper surface of the main body. The anti-surge resistor further includes a second protective layer covering the first protective layer, a portion of the first upper electrode, and a portion of the second upper electrode.

In accordance with one or more embodiments of the invention, the substrate and the resistance layer are electrically connected in parallel.

In accordance with one or more embodiments of the invention, the anti-surge resistor further includes a grounded electrode disposed on the lower surface of the main body and located between the first lower electrode and the second lower electrode. The grounded electrode, the first lower electrode, and the second lower electrode are spaced apart and disposed on the lower surface of the main body.

In accordance with one or more embodiments of the invention, the anti-surge resistor further includes a first grounded capacitor disposed on the lower surface of the main body and located between the first lower electrode and the grounded electrode. The anti-surge resistor further includes a second grounded capacitor disposed on the lower surface of the main body and located between the second lower electrode and the grounded electrode.

In accordance with one or more embodiments of the invention, the resistance layer is formed by printing or coating.

In accordance with one or more embodiments of the invention, the first protective layer and the second protective layer are ink layers, polyimide film layers, or photo solder resist layers.

The present invention further provides a fabrication method of an anti-surge resistor. The fabrication method includes: providing a substrate made by a varistor material; forming a resistance layer on an upper surface of the substrate to provide a main body composed of the substrate and the resistance layer, in which the main body has two opposite terminals; and forming a first terminal electrode on one of the terminals of the main body and forming a second terminal electrode on the other one of the terminals of the main body, such that the substrate and the resistance layer are electrically connected in parallel.

In accordance with one or more embodiments of the invention, the resistance layer is formed by printing or coating.

In accordance with one or more embodiments of the invention, the fabrication method further includes: forming a first protective layer on an upper surface of the resistance layer; and forming a second protective layer on the first protective layer to cover the first protective layer. The first protective layer and the second protective layer are ink layers, polyimide film layers, or photo solder resist layers.

In accordance with one or more embodiments of the invention, the fabrication method further includes: forming a grounded electrode on a lower surface of the substrate; forming a first grounded capacitor on the lower surface of the substrate; and forming a second grounded capacitor on the lower surface of the substrate. The grounded electrode is located between the first grounded capacitor and the second grounded capacitor.

In accordance with one or more embodiments of the invention, the first terminal electrode includes a first upper electrode, a first lower electrode, and a first side electrode. The first upper electrode is disposed on an upper surface of the main body, and the first lower electrode is disposed on a lower surface of the main body, and the first side electrode is disposed on a first side surface of the main body and extended to the first upper electrode and the first lower electrode. The second terminal electrode includes a second upper electrode, a second lower electrode, and a second side electrode. The second upper electrode is disposed on the upper surface of the main body, and the second lower electrode is disposed on the lower surface of the main body, and the second side electrode is disposed on a second side surface of the main body and extended to the second upper electrode and the second lower electrode. The upper surface of the main body is opposite to the lower surface of the main body. The first side surface of the main body is opposite to the second side surface of the main body.

In accordance with one or more embodiments of the invention, the first protective layer is located between the first upper electrode and the second upper electrode. The first protective layer covers a portion of the resistance layer exposed by the upper surface of the main body. The second protective layer further covers a portion of the first upper electrode and a portion of the second upper electrode.

In accordance with one or more embodiments of the invention, the grounded electrode is located between the first lower electrode and the second lower electrode. The grounded electrode, the first lower electrode, and the second lower electrode are spaced apart and disposed on the lower surface of the main body.

In accordance with one or more embodiments of the invention, the first grounded capacitor is located between the first lower electrode and the grounded electrode. The second grounded capacitor is located between the second lower electrode and the grounded electrode.

In order to let above mention of the present invention and other objects, features, advantages, and embodiments of the present invention to be more easily understood, the description of the accompanying drawing as follows.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present invention are further described in detail below with reference to the accompanying drawings, however, the embodiments described are not intended to limit the present invention and it is not intended for the description of operation to limit the order of implementation. The using of "first", "second", "third", etc. in the specification should be understood for identify units or data described by the same terminology, but are not referred to particular order or sequence.

Figure 1:
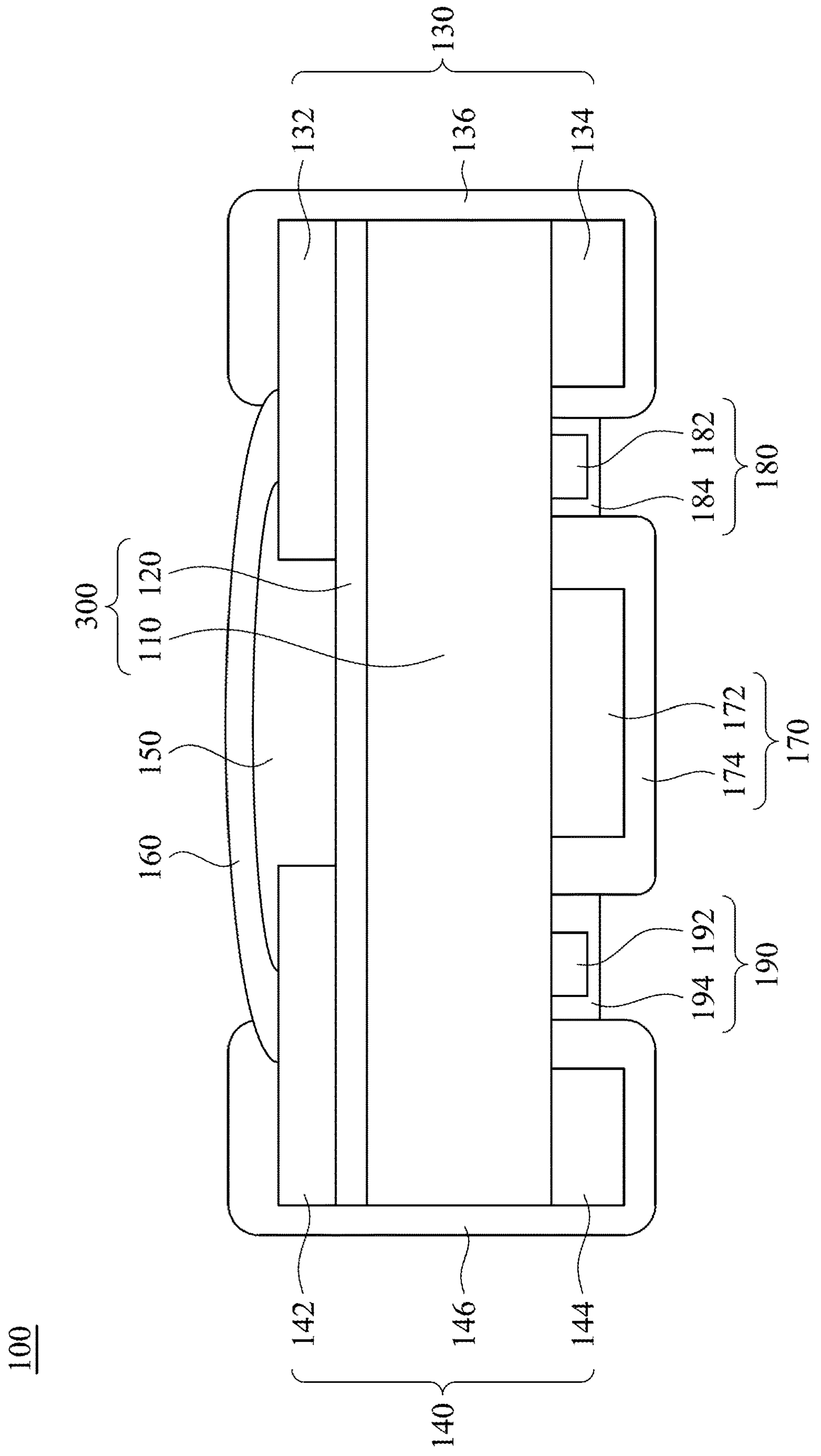
FIG. 1 illustrates a structural diagram of an anti-surge resistor according to some embodiments of the present invention.

FIG. 1 illustrates a structural diagram of an anti-surge resistor 100 according to some embodiments of the present invention. The anti-surge resistor 100 includes a substrate 110 made by a varistor material, a resistance layer 120 disposed on the substrate 110, and a first terminal electrode 130 and a second terminal electrode 140. As shown in FIG. 1, the resistance layer 120 is disposed on an upper surface of the substrate 110 to provide the resistance value required by the user.

In some embodiments of the present invention, the varistor material is a metal oxide varistor (MOV) material, but the embodiments of the present invention are not limited thereto. The resistance value of the varistor material varies with the external voltage. In some embodiments of the present invention, the varistor material is a material with high resistance value, and the maximum resistance value (Rm) of the resistance value of the varistor material is more than 10 times larger than the resistance value of the resistance layer 120. In some embodiments of the present invention, the main component of the varistor material is zinc oxide (ZnO), but the embodiments of the present invention are not limited thereto.

In some embodiments of the present invention, the material of the resistance layer 120 includes, for example, silver-copper alloy, nickel-chromium-copper alloy, nickel-chromium-silicon alloy, manganese-copper alloy or nickel-copper alloy, but the embodiments of the present invention are not limited thereto.

The substrate 110 and the resistance layer 120 form a main body 300, and the main body 300 has opposite terminals (i.e., the right terminal and the left terminal). The first terminal electrode 130 and the second terminal electrode 140 are respectively disposed on the opposite terminals of the main body 300 to provide the circuit contacts of the anti-surge resistor 100.

In some embodiments of the present invention, the first terminal electrode 130 includes a first upper electrode 132, a first lower electrode 134, and a first side electrode 136, and the second terminal electrode 140 includes a second upper electrode 142, a second lower electrode 144, and a second side electrode 146. The first upper electrode 132 and the second upper electrode 142 are disposed on the upper surface of the main body 300 (i.e., the upper surface of the resistive layer 120) and are respectively located at opposite ends of the resistive layer 120. The first lower electrode 134 and the second lower electrode 144 are disposed on the lower surface of the main body 300 (i.e., the lower surface of the substrate 110) and are respectively located at opposite ends of the substrate 110. In some embodiments of the present invention, the first upper electrode 132 and the second upper electrode 142 are respectively aligned with the first lower electrode 134 and the second lower electrode 144, and the first upper electrode 132 and the first lower electrode 134 are respectively aligned with the second upper electrode 142 and the second lower electrode 144, but the embodiments of the present invention are not limited thereto.

The first side electrode 136 is disposed on a side surface of the main body 300 and extended to the first upper electrode 132 and the first lower electrode 134. Specifically, one end of the first side electrode 136 is disposed on the first upper electrode 132 and extends to the first lower electrode 134 along the side surface of the resistance layer 120 and the side surface of the substrate 110 in sequence, such that the other end of the first side electrode 136 is disposed on the first lower electrode 134. Similarly, the second side electrode 146 is disposed on the other side surface of the main body 300 and extended to the second upper electrode 142 and the second lower electrode 144. Specifically, one end of the second side electrode 146 is disposed on the second upper electrode 142 and extends to the second lower electrode 144 along the other side surface of the resistance layer 120 and the other side surface of the substrate 110 in sequence, such that the other end of the second side electrode 146 is disposed on the second lower electrode 144.

As shown in FIG. 1, the anti-surge resistor 100 further includes a first protective layer 150 and a second protective layer 160. The first protective layer 150 is disposed on the resistance layer 120 (i.e., disposed on the upper surface of the main body 300) and is located between the first upper electrode 132 and the second upper electrode 142. The first protective layer 150 covers a portion of the resistance layer 120 exposed by the upper surface of the main body 300, thereby protecting the resistance layer 120. The second protective layer 160 is disposed on the first protective layer 150 and covers the first protective layer 150, a portion of the first upper electrode 132 and a portion of the second upper electrode 142, such that the second protective layer 160 further protects the resistance layer 120. The first protective layer 150 and the second protective layer 160 can prevent damage to the resistance layer 120. For example, the first protective layer 150 and the second protective layer 160 can prevent the resistance layer 120 from contacting with the outside air and prevent the water vapor from eroding the resistance layer 120. In some embodiments of the present invention, the first protective layer 150 and the second protective layer 160 may be ink layers, polyimide film layers, or photo solder resist layers, but the embodiments of the present invention are not limited thereto.

As shown in FIG. 1, the anti-surge resistor 100 further includes a grounded electrode 170, a first grounded capacitor 180, and a second grounded capacitor 190. The grounded electrode 170, the first grounded capacitor 180, and the second grounded capacitor 190 are all disposed on the lower surface of the main body 300 (i.e., the lower surface of the substrate 110). The grounded electrode 170 is located between the first lower electrode 134 and the second lower electrode 144. The grounded electrode 170, the first lower electrode 134, and the second lower electrode 144 are spaced apart and disposed on the lower surface of the main body 300. The first grounded capacitor 180 is located between the first lower electrode 134 and the grounded electrode 170. The second grounded capacitor 190 is located between the second lower electrode 144 and the grounded electrode 170. In some embodiments of the present invention, the grounded electrode 170 enables the substrate 110 and the resistive layer 120 to achieve a parallel grounding effect. Specifically, when the grounded electrode 170 is grounded, the grounded electrode 170 can absorb pulse surge to achieve an anti-surge effect. In some embodiments of the present invention, the first grounded capacitor 180 and the second grounded capacitor 190 are utilized to increase the anti-surge capability of the anti-surge resistor 100.

As shown in FIG. 1, the grounded electrode 170 includes a back electrode layer 172 and a back conductor layer 174. The back electrode layer 172 is disposed on the lower surface of the main body 300 (i.e., the lower surface of the substrate 110). The back conductor layer 174 is disposed on the back electrode layer 172 and covers the back electrode layer 172.

As shown in FIG. 1, the first grounded capacitor 180 includes a first grounded capacitor electrode 182 and a first dielectric insulating material layer 184. The first grounded capacitor electrode 182 is disposed on the lower surface of the main body 300 (i.e., the lower surface of the substrate 110). The first dielectric insulating material layer 184 is disposed on the first grounded capacitor electrode 182 and covers the first grounded capacitor electrode 182. Specifically, the first dielectric insulating material layer 184 is a dielectric insulating material covering the first grounded capacitor electrode 182 to form the first grounded capacitor 180.

As shown in FIG. 1, the second grounded capacitor 190 includes a second grounded capacitor electrode 192 and a second dielectric insulating material layer 194. The second grounded capacitor electrode 192 is disposed on the lower surface of the main body 300 (i.e., the lower surface of the substrate 110). The second dielectric insulating material layer 194 is disposed on the second grounded capacitor electrode 192 and covers the second grounded capacitor electrode 192. Specifically, the second dielectric insulating material layer 194 is a dielectric insulating material covering the second grounded capacitor electrode 192 to form the second grounded capacitor 190.

As discussed above, the substrate 110 (i.e., the carrier substrate) of the anti-surge resistor 100 of the embodiments of the present invention is made by the varistor material. Therefore, when the anti-surge resistor 100 encounters a surge or electrostatic damage (ESD), the substrate 110 made by the varistor material is used as an anti-surge protection element to overcome excessive current by conducting electricity, thereby preventing surge or electrostatic damage (ESD) from damaging the anti-surge resistor 100.

It is worth mentioning that the number of the grounded electrode in the embodiments of the present invention is not limited to one. In other words, in other embodiments of the present invention, the number of the grounded electrode may be two, three, or more. In addition, it can be understood that when the number of the grounded electrodes is two, the number of the grounded capacitors is correspondingly three. Further, when the number of the grounded electrodes is three, the number of the grounded capacitors is correspondingly four, and so on. Specifically, at least one grounded electrode is formed on the backside of the anti-surge resistor 100.

Figure 2:
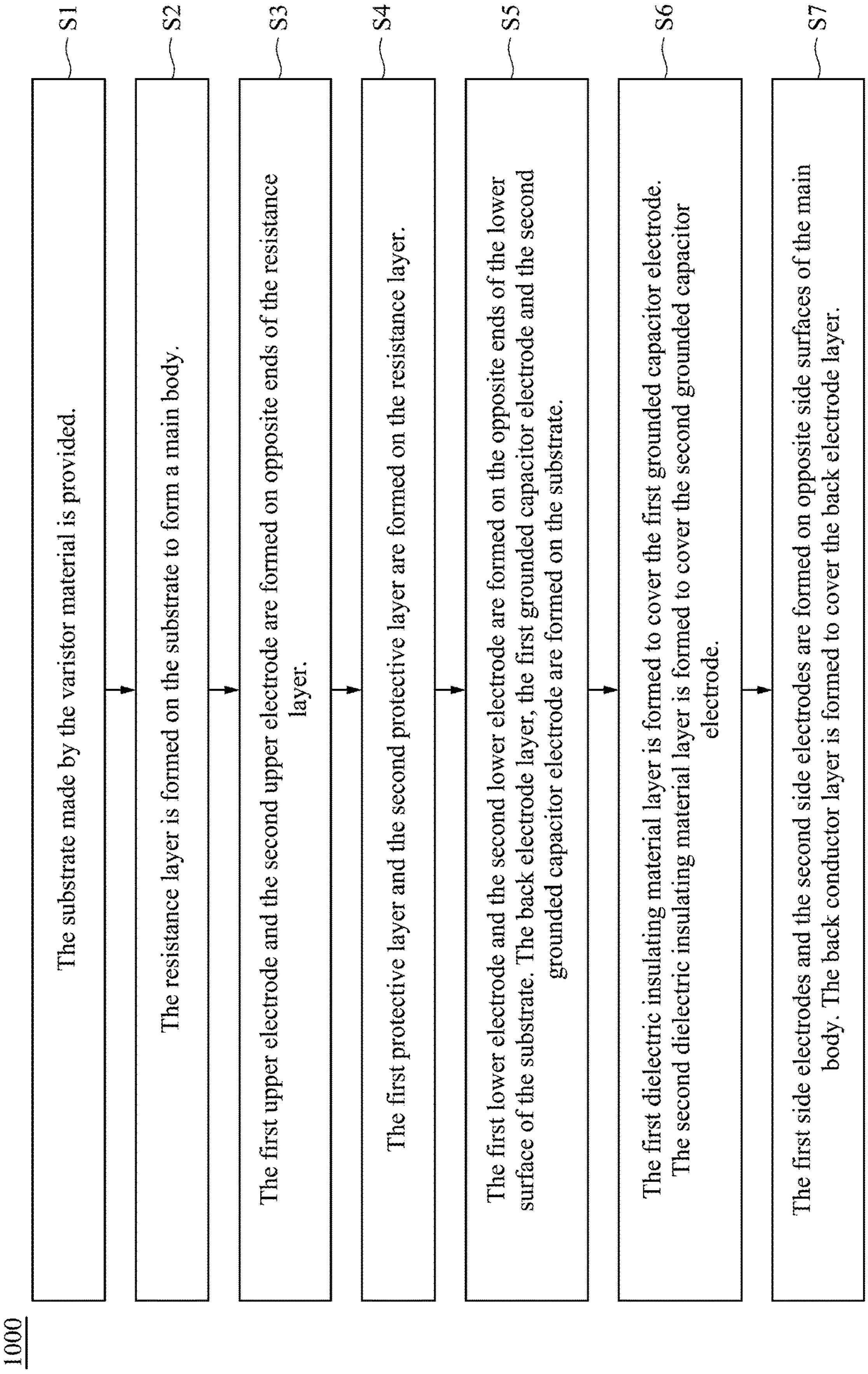
FIG. 2 illustrates a flowchart of a fabrication method of the anti-surge resistor according to some embodiments of the present invention.
Figure 3:
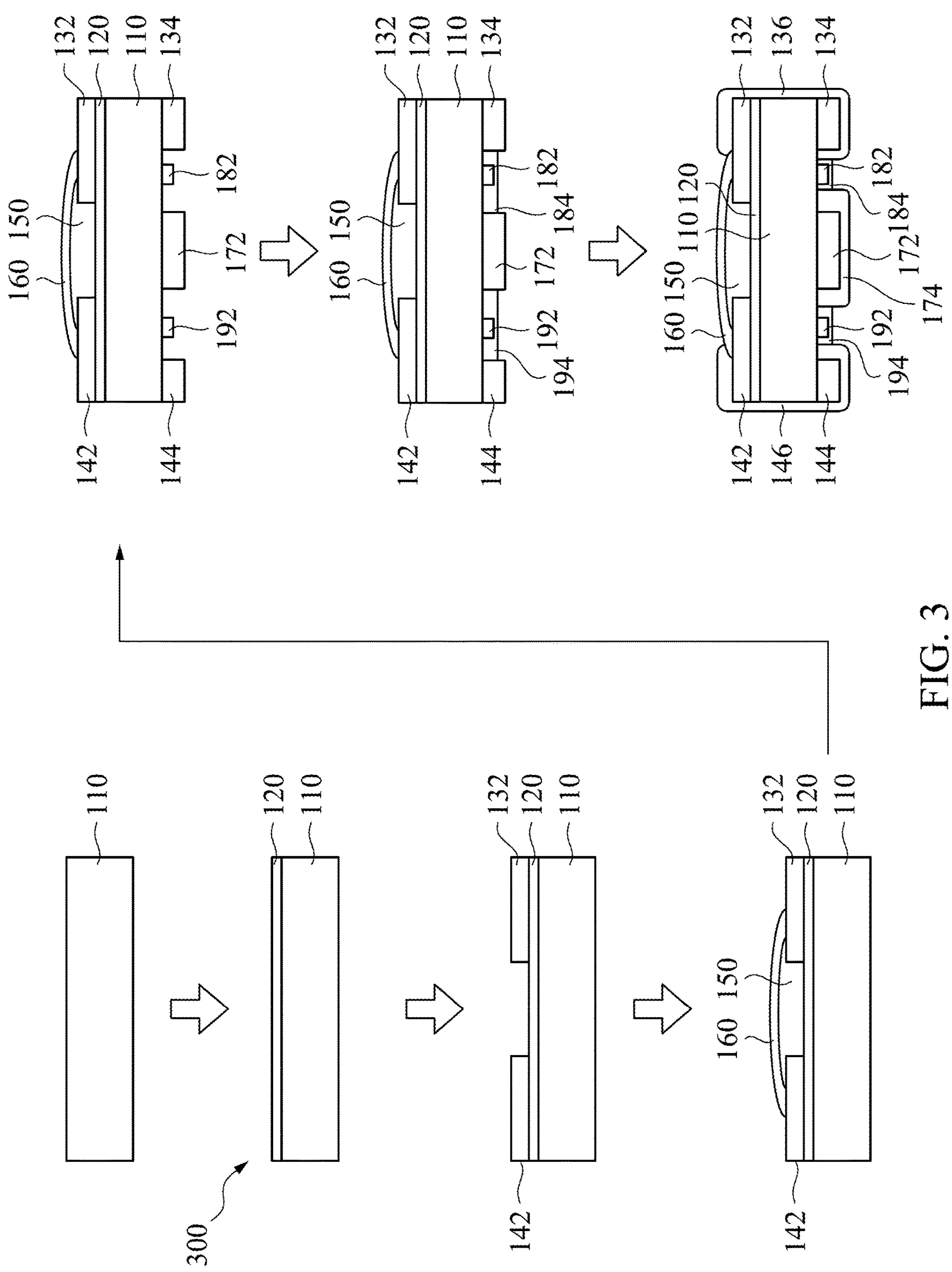
FIG. 3 illustrates a structural diagram of the anti-surge resistor corresponding to the intermediate stage of the fabrication method according to some embodiments of the present invention.

FIG. 2 illustrates a flowchart of a fabrication method 1000 of the anti-surge resistor 100 according to some embodiments of the present invention. FIG. 3 illustrates a structural diagram of the anti-surge resistor 100 corresponding to the intermediate stage of the fabrication method 1000 according to some embodiments of the present invention.

The fabrication method 1000 includes the steps S1-S7. First, in step S1, the substrate 110 made by the varistor material is provided. Then, in step S2, the resistance layer 120 is formed on the upper surface of the substrate 110. The substrate 110 and the resistance layer 120 are used as the main body 300 of the anti-surge resistor 100. In other words, the main body 300 is composed of the substrate 110 and the resistance layer 120 formed on the substrate 110. In some embodiments of the present invention, the resistance layer 120 is formed on the substrate 110 by printing, coating, or physical vapor deposition (PVD), but the embodiments of the present invention are not limited thereto.

Next, in step S3, the first upper electrode 132 and the second upper electrode 142 are respectively formed on opposite ends of the resistance layer 120. Then, in step S4, the first protective layer 150 and the second protective layer 160 are sequentially formed on the resistance layer 120.

Next, in step S5, the first lower electrode 134 and the second lower electrode 144 are formed on the opposite ends of the lower surface of the substrate 110, and the back electrode layer 172, the first grounded capacitor electrode 182 and the second grounded capacitor electrode 192 are formed on the lower surface of the substrate 110. Then, in step S6, the first dielectric insulating material layer 184 is formed on the first grounded capacitor electrode 182 to cover the first grounded capacitor electrode 182, and the second dielectric insulating material layer 194 is formed on the second grounded capacitor electrode 192 to cover the second grounded capacitor electrode 192. The first grounded capacitor electrode 182 and the second grounded capacitor electrode 192 are formed by sputtering, electroplating or printing. The first dielectric insulating material layer 184 and the second dielectric insulating material layer 194 are insulating oxides or interface insulating materials.

Finally, in step S7, the first side electrodes 136 and the second side electrodes 146 are respectively formed on two opposite side surfaces of the main body 300, and the back conductor layer 174 is formed on the back electrode layer 172 to cover the back electrode layer 172.

Figure 4:
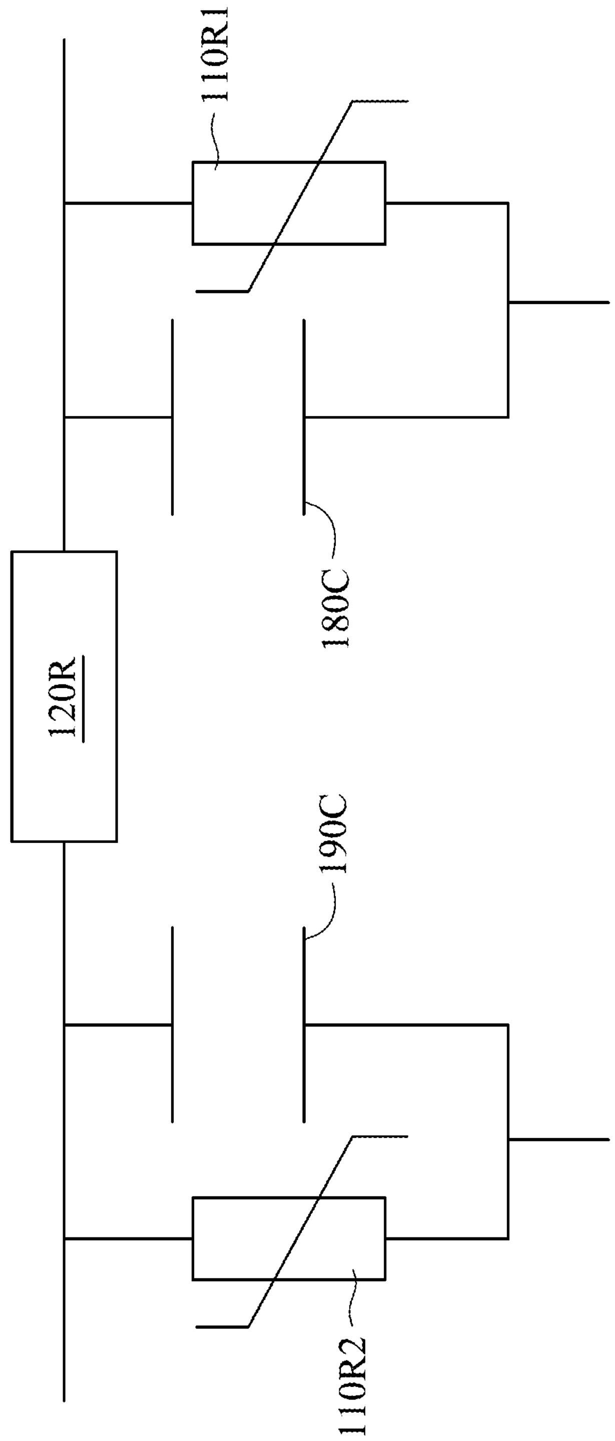
FIG. 4 illustrates an equivalent circuit diagram of the anti-surge resistor according to some embodiments of the present invention.

FIG. 4 illustrates an equivalent circuit diagram of the anti-surge resistor 100 according to some embodiments of the present invention. In detail, FIG. 4 is an equivalent circuit diagram when the grounded electrode 170 of the anti-surge resistor 100 is electrically connected to the grounded potential. The resistor 120R represents the resistance of the resistance layer 120. The resistor 110R1 represents the resistance of the substrate 110 made by the varistor material from the first terminal electrode 130 to the grounded electrode 170. The resistor 110R2 represents the resistance of the substrate 110 made by the varistor material from the second terminal electrode 140 to the grounded electrode 170. The sum value of the resistor 110R1 and the resistor 110R2 in series represents the overall resistance of the substrate 110. As shown in FIG. 4, the resistor 120R of the resistance layer 120 is electrically connected in parallel with the resistor 110R1/110R2 of the substrate 110. In addition, the capacitor 180C in FIG. 4 represents the capacitance of the first grounded capacitor 180, and the capacitor 190C represents the capacitance of the second grounded capacitor 190.

Figure 5:
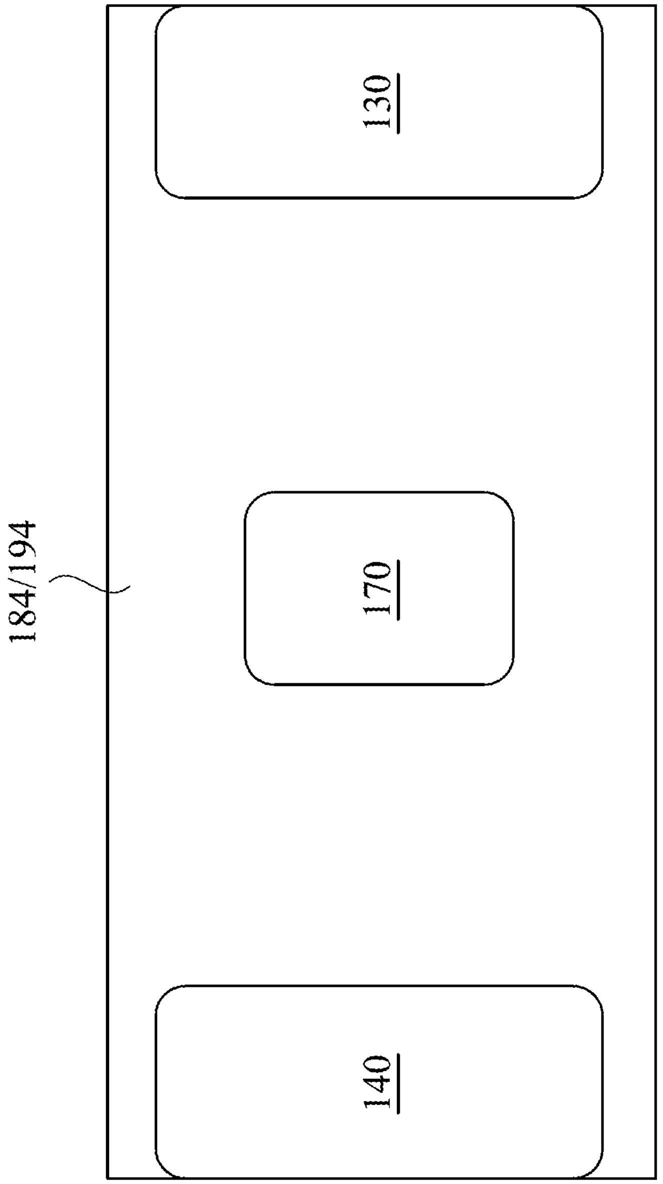
FIG. 5 illustrates a schematic diagram showing the soldering surface of backside of the anti-surge resistor according to some embodiments of the present invention.

FIG. 5 illustrates a schematic diagram showing the soldering surface of backside of the anti-surge resistor 100 according to some embodiments of the present invention. Specifically, the composition of the anti-surge resistor 100 shown in FIG. 1 constitutes a chip resistor, and the first terminal electrode 130, the grounded electrode 170 and the second terminal electrode 140 located on the backside of the anti-surge resistor 100 are solderable electrode junctions, and the first terminal electrode 130 and the grounded electrode 170 are separated by the first dielectric insulating material layer 184, and the grounded electrode 170 and the second terminal electrode 140 are separated by the second dielectric insulating material layer 194, such that the anti-surge resistor 100 is soldered to the circuit board, thereby realizing the electrical connection between the anti-surge resistor 100 and the circuit board.

Figure 6:
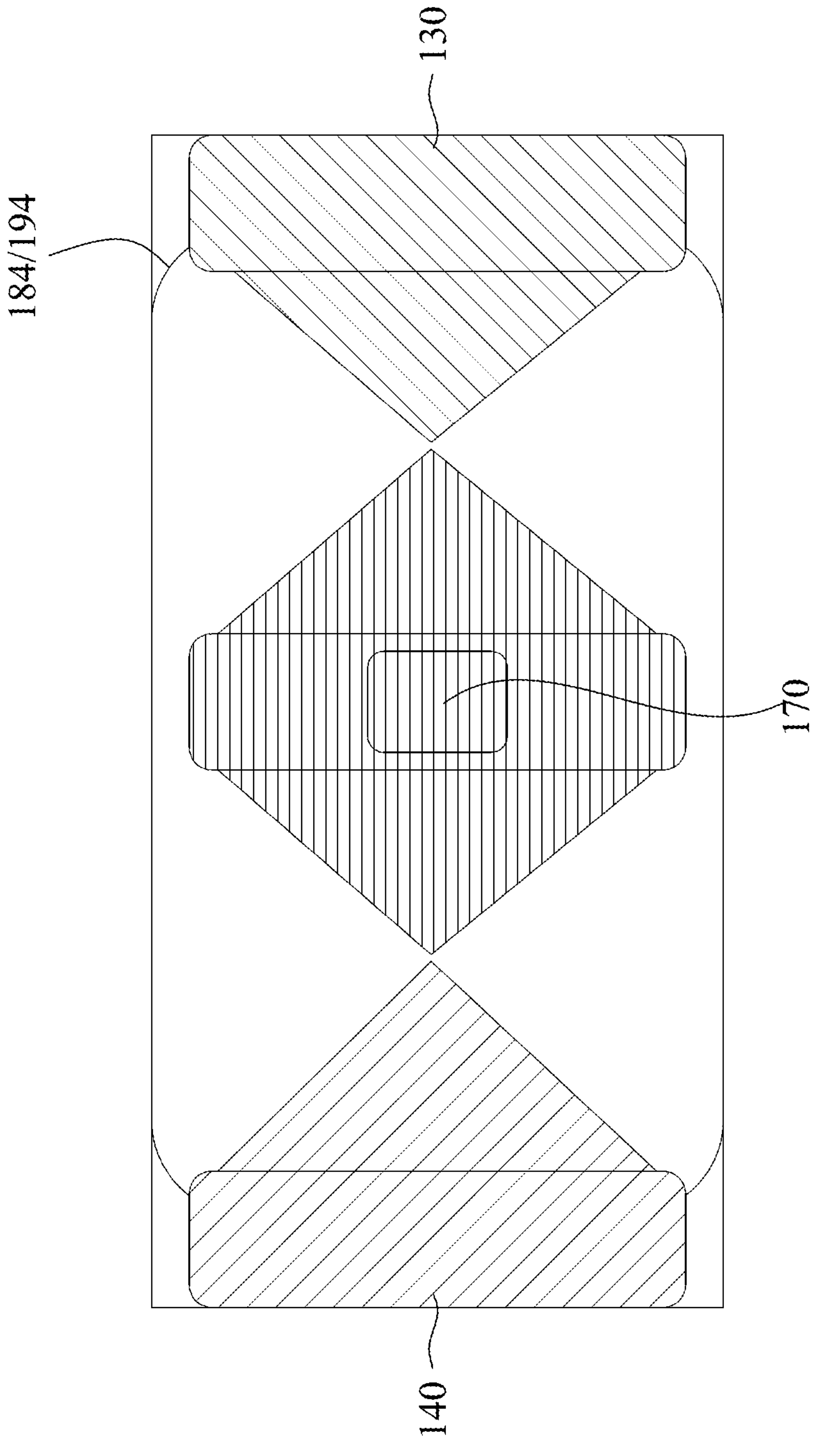
FIG. 6 illustrates a perspective view of the backside of the anti-surge resistor according to one embodiment of the present invention.
Figure 7:
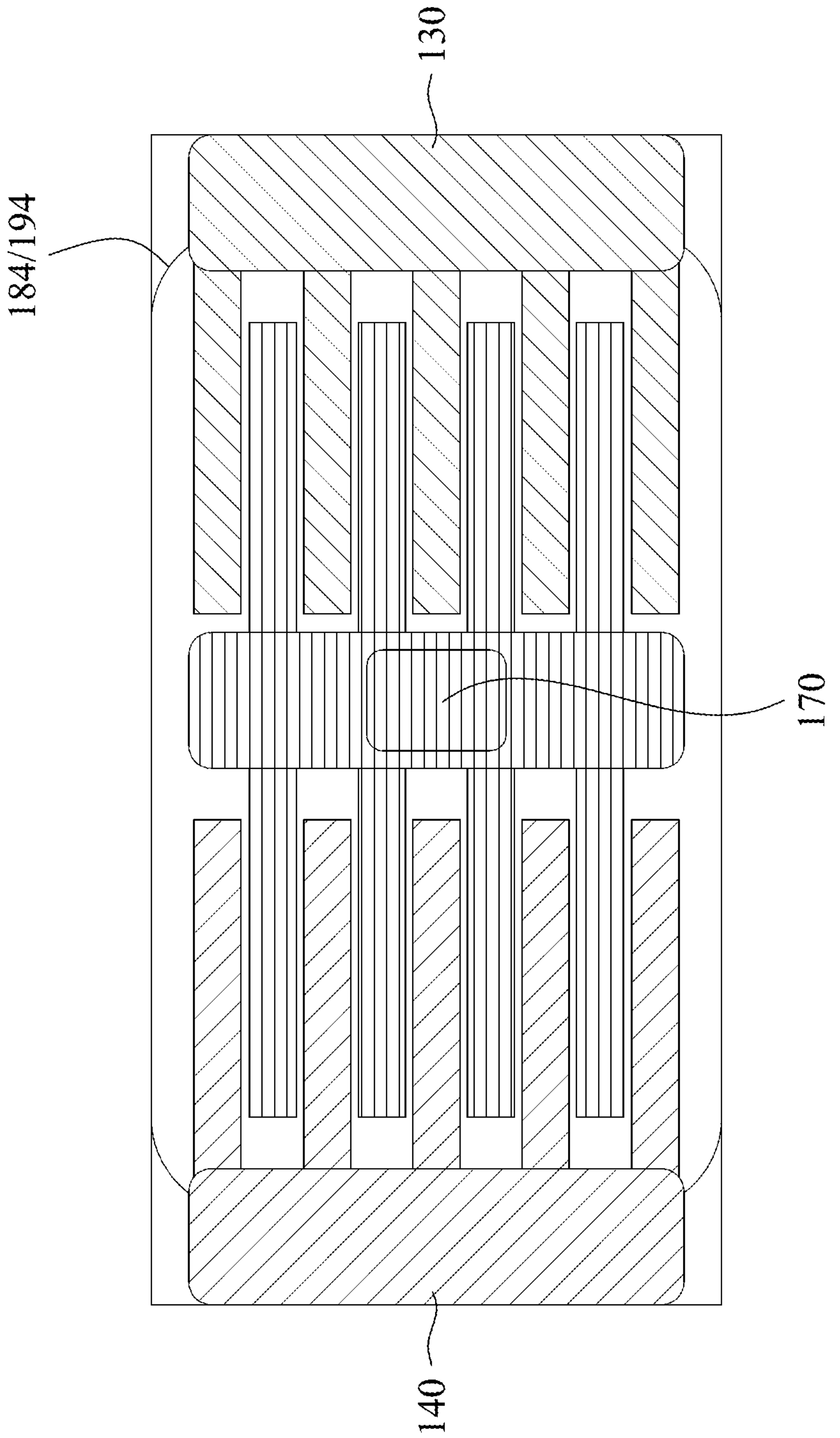
FIG. 7 illustrates a perspective view of the backside of the anti-surge resistor according to another embodiment of the present invention.

FIG. 6 illustrates a perspective view of the backside of the anti-surge resistor 100 according to one embodiment of the present invention. FIG. 7 illustrates a perspective view of the backside of the anti-surge resistor 100 according to another embodiment of the present invention. Specifically, FIG. 6 and FIG. 7 show two designs of the electrode patterns of the first terminal electrode 130, the grounded electrode 170 and the second terminal electrode 140. FIG. 6 and FIG. 7 are used for different design purposes by IC design circuit users. According to the different requirements for surge withstand and/or withstand voltage frequency in practical applications, two designs as shown in FIG. 6 and FIG. 7 are provided. The design in FIG. 6 can provide a circuit design with high voltage resistance. The design in FIG. 7 can provide a circuit design with withstand voltage frequency. It should be noted that the designs of the electrode patterns shown in FIG. 6 and FIG. 7 are merely two examples, and the embodiments of the present invention are not limited thereto.

From the above description, the present invention provides an anti-surge resistor, and the carrier substrate of the anti-surge resistor is made by the varistor material. Therefore, when the anti-surge resistor encounters a surge or electrostatic damage (ESD), the substrate made by the varistor material is used as an anti-surge protection element to overcome excessive current by conducting electricity, thereby preventing surge or electrostatic damage (ESD) from damaging the anti-surge resistor.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An anti-surge resistor, comprising:

a substrate made by a varistor material;

a resistance layer disposed on an upper surface of the substrate to form a main body with the substrate, wherein the main body has two opposite terminals;

a first terminal electrode formed on one of the terminals of the main body;

a second terminal electrode formed on the other one of the terminals of the main body;

a grounded electrode disposed on a lower surface of the substrate;

a first grounded capacitor disposed on the lower surface of the substrate; and a second grounded capacitor disposed on the lower surface of the substrate;

wherein the grounded electrode is located between the first grounded capacitor and the second grounded capacitor.

2. The anti-surge resistor of claim 1, wherein the first terminal electrode comprises a first upper electrode, a first lower electrode, and a first side electrode, wherein the first upper electrode is disposed on an upper surface of the main body, and the first lower electrode is disposed on a lower surface of the main body, and the first side electrode is disposed on a first side surface of the main body and extended to the first upper electrode and the first lower electrode;

wherein the second terminal electrode comprises a second upper electrode, a second lower electrode, and a second side electrode, wherein the second upper electrode is disposed on the upper surface of the main body, and the second lower electrode is disposed on the lower surface of the main body, and the second side electrode is disposed on a second side surface of the main body and extended to the second upper electrode and the second lower electrode;

wherein the upper surface of the main body is opposite to the lower surface of the main body;

wherein the first side surface of the main body is opposite to the second side surface of the main body.

3. The anti-surge resistor of claim 2, further comprising:

a first protective layer disposed on the upper surface of the main body and located between the first upper electrode and the second upper electrode, wherein the first protective layer covers a portion of the resistance layer exposed by the upper surface of the main body; and a second protective layer covering the first protective layer, a portion of the first upper electrode, and a portion of the second upper electrode.

4. The anti-surge resistor of claim 1, wherein the substrate and the resistance layer are electrically connected in parallel.

5. The anti-surge resistor of claim 2, wherein the ground electrode is located between the first lower electrode and the second lower electrode, wherein the grounded electrode, the first lower electrode, and the second lower electrode are spaced apart and disposed on the lower surface of the main body.

6. The anti-surge resistor of claim 5, wherein the first grounded capacitor is located between the first lower electrode and the grounded electrode; and wherein the second grounded capacitor is located between the second lower electrode and the grounded electrode.

7. The anti-surge resistor of claim 1, wherein the resistance layer is formed by printing or coating.

8. The anti-surge resistor of claim 3, wherein the first protective layer and the second protective layer are ink layers, polyimide film layers, or photo solder resist layers.

9. A fabrication method of an anti-surge resistor, comprising:

providing a substrate made by a varistor material;

forming a resistance layer on an upper surface of the substrate to provide a main body composed of the substrate and the resistance layer, wherein the main body has two opposite terminals;

forming a first terminal electrode on one of the terminals of the main body and forming a second terminal electrode on the other one of the terminals of the main body, such that the substrate and the resistance layer are electrically connected in parallel;

forming a grounded electrode on a lower surface of the substrate;

forming a first grounded capacitor on the lower surface of the substrate; and forming a second grounded capacitor on the lower surface of the substrate;

wherein the grounded electrode is located between the first grounded capacitor and the second grounded capacitor.

10. The fabrication method of claim 9, wherein the resistance layer is formed by printing or coating.

11. The fabrication method of claim 9, further comprising:

forming a first protective layer on an upper surface of the resistance layer; and forming a second protective layer on the first protective layer to cover the first protective layer;

wherein the first protective layer and the second protective layer are ink layers, polyimide film layers, or photo solder resist layers.

12. The fabrication method of claim 9, wherein the first terminal electrode comprises a first upper electrode, a first lower electrode, and a first side electrode, wherein the first upper electrode is disposed on an upper surface of the main body, and the first lower electrode is disposed on a lower surface of the main body, and the first side electrode is disposed on a first side surface of the main body and extended to the first upper electrode and the first lower electrode;

wherein the second terminal electrode comprises a second upper electrode, a second lower electrode, and a second side electrode, wherein the second upper electrode is disposed on the upper surface of the main body, and the second lower electrode is disposed on the lower surface of the main body, and the second side electrode is disposed on a second side surface of the main body and extended to the second upper electrode and the second lower electrode;

wherein the upper surface of the main body is opposite to the lower surface of the main body;

wherein the first side surface of the main body is opposite to the second side surface of the main body.

13. The fabrication method of claim 12, wherein the first protective layer is located between the first upper electrode and the second upper electrode;

wherein the first protective layer covers a portion of the resistance layer exposed by the upper surface of the main body;

wherein the second protective layer further covers a portion of the first upper electrode and a portion of the second upper electrode.

14. The fabrication method of claim 12, wherein the grounded electrode is located between the first lower electrode and the second lower electrode, wherein the grounded electrode, the first lower electrode, and the second lower electrode are spaced apart and disposed on the lower surface of the main body.

15. The fabrication method of claim 12, wherein the first grounded capacitor is located between the first lower electrode and the grounded electrode, wherein the second grounded capacitor is located between the second lower electrode and the grounded electrode.

* * * * *